(12) United States Patent
Song

(10) Patent No.: US 7,690,476 B2
(45) Date of Patent: Apr. 6, 2010

(54) CLEARANCE ADJUSTING DECELERATOR AND ELECTRIC POWER STEERING APPARATUS HAVING THE SAME

(75) Inventor: Joon-kyu Song, Seongnam (KR)

(73) Assignee: Mando Corporation (KR)

( * ) Notice: Subject to any disclaimer, the term of this patent is extended or adjusted under 35 U.S.C. 154(b) by 21 days.

(21) Appl. No.: 12/080,580

(22) Filed: Apr. 3, 2008

(65) Prior Publication Data

US 2008/0245601 A1 Oct. 9, 2008

(30) Foreign Application Priority Data

Apr. 6, 2007 (KR) .................. 10-2007-0034163

(51) Int. Cl.
*B62D 5/04* (2006.01)
(52) U.S. Cl. ............... 180/444; 74/10.85; 74/89.14; 74/724; 74/490.11; 74/425

(58) Field of Classification Search .............. 180/444; 74/10.85, 89.14, 724, 425, 490.11
See application file for complete search history.

(56) References Cited

U.S. PATENT DOCUMENTS

| 4,020,715 | A * | 5/1977 | Sollars .................. 74/606 R |
| 4,790,202 | A * | 12/1988 | Hayashi et al. .............. 74/396 |
| 5,777,411 | A * | 7/1998 | Nakajima et al. ............. 310/83 |
| 6,032,550 | A * | 3/2000 | Rugh ......................... 74/425 |
| 6,912,927 | B2 * | 7/2005 | Eberle ........................ 74/425 |
| 7,201,075 | B2 * | 4/2007 | Tsutsui et al. ............ 74/388 PS |
| 7,540,204 | B2 * | 6/2009 | Harata et al. ........... 73/862.331 |
| 2001/0010280 | A1* | 8/2001 | Torii et al. .................... 192/38 |
| 2002/0020239 | A1* | 2/2002 | Adachi et al. ................. 74/425 |

* cited by examiner

*Primary Examiner*—Lesley Morris
*Assistant Examiner*—Tashiana Adams
(74) *Attorney, Agent, or Firm*—Harness, Dickey & Pierce, P.L.C.

(57) ABSTRACT

Disclosed is a clearance adjusting decelerator and an electric power steering apparatus having the same.

7 Claims, 7 Drawing Sheets

US 7,690,476 B2

CLEARANCE ADJUSTING DECELERATOR AND ELECTRIC POWER STEERING APPARATUS HAVING THE SAME

CROSS-REFERENCE TO RELATED APPLICATION

This non-provisional application claims priority under 35 U.S.C §119(a) on Patent Application No. 10-2007-0034163 filed in Korea on Apr. 6, 2007, the entire contents of which are hereby incorporated by reference.

BACKGROUND OF THE INVENTION

1. Field of the invention

The present invention relates to a clearance adjusting decelerator and an electric power steering apparatus having the same, and more particularly to a clearance adjusting decelerator and an electric power steering apparatus having the same in which a gear housing constructing a decelerator of a conventional electric power steering apparatus is divided into three parts: a rotary housing having a worm wheel housing and a worm/motor housing; a first worm wheel housing cap; and a second worm wheel housing cap, and the decelerator is assembled having the concentricity between a worm wheel housing pivot center axis and a worm wheel center axis of a first and a second worm wheel housing cap, and then the rotary housing relatively rotates to the first worm wheel housing cap and the second worm wheel housing cap when a worm tooth is matched with a worm wheel tooth so as to control the distance between the worm tooth and the worm wheel tooth, so that clearance is controlled.

2. Description of the Related Art

FIG. 1 is a diagram illustrating a conventional electric power steering apparatus. As shown in FIG. 1, the electric power steering apparatus 100 includes a steering system 130 connected from a steering wheel 102 to both side wheels 126, and an auxiliary power mechanism 140 supplying the steering auxiliary power to the steering system 130.

The steering system 130 includes a steering shaft 106 in which one side of the steering shaft 106 is connected to the steering wheel 102 so as to rotate with the steering wheel 102 and the other side of the steering shaft 106 is connected to a pinion axis 108 via a pair of universal joints 104. Further, the pinion axis 108 is connected to a rack bar 112 by a rack-pinion mechanism 110 and both ends of the rack bar 112 is connected to the wheels 126 of a vehicle by a tie rod 122 and a knuckle arm 124.

The auxiliary power mechanism 140 includes a torque sensor 142 for sensing torque applied to the steering wheel 102 by a driver and outputting an electric signal proportional to the sensed torque, an electronic control unit 144 for generating a control signal based on the electric signal transferred from the torque sensor 142, a motor 146 for generating the auxiliary power based on the control signal transferred from the electronic control unit 144, and a decelerator 150 having a worm 152 and a worm wheel 156 in order to transfer the auxiliary power generated in the motor 146 to the steering shaft 106.

Therefore, in the electric power steering apparatus, the torque generated by the rotation of the steering wheel 102 is transferred to the rack bar 112 via the rack-pinion mechanism 110 and the auxiliary power generated in the motor 146 based on the generated torque is transferred to the rack bar 112.

That is, the torque generated by the rotation of the steering wheel 102 and the auxiliary power generated in the motor 146 is combined so that the rack bar 112 can be moved in the direction of the axis.

FIG. 2 is a cross-sectional view illustrating a decelerator of a conventional electric power steering apparatus. As shown in FIG. 2, the decelerator 150 has a structure in which a worm shaft 254 formed with the worm 152 is provided wherein a first ball bearing 257 and a second ball bearing 258 are installed in both ends of the worm shaft 254, respectively, so as to support the worm shaft 254, and the worm shaft 254 is connected to a rotary shaft 270 of the motor 146 so that the worm shaft 254 rotates by the driving of the motor 146.

Further, the worm wheel 156 is provided in one side of an outer diameter of the worm 152 to be engaged with the worm 152 formed on the worm shaft 254, and is mounted on the steering shaft 106 which transfers the rotational force of the steering wheel 102 operated by the driver so as to transfer the rotational force of the worm shaft 254 generated by the driving of the motor 146 to the steering shaft 106.

A gear housing 260 includes the worm 152, the worm wheel 156, the rotary shaft 270 or the like therein, and the motor 146 for providing the driving force to the rotary shaft 270 is mounted on one side of the gear housing 260.

In the decelerator 150 of the electric power steering apparatus having the above structure, the electronic control unit 144 mounted on a vehicle controls the driving of the motor 146 depending on a driving condition of the vehicle and the rotational force of the worm shaft 254 generated by the driving of the motor 146 is added to the rotational force of the steering wheel 102 operated by the driver so as to be transferred to the steering shaft 106 such that smooth and stable steering can be achieved.

In the conventional electric power steering apparatus, the process of adjusting the gap between a worm gear and a worm wheel gear constructing the decelerator is required for managing clearance and noise. That is, the decelerator is manufactured through a complicated process in which the center distance of the worm gear and the worm wheel gear is firstly measured, the center distance of the gear housing and the worm wheel gear is secondly measured, and then the gap between the worm gear and the worm wheel gear is matched, so that there have been problems that the manufacturing process is complicated and an excessive amount of stock occurs.

SUMMARY OF THE INVENTION

Accordingly, the present invention has been made to solve the above-mentioned problems occurring in the prior art, and the present invention provides a clearance adjusting decelerator and an electric power steering apparatus having the same in which a gear housing constructing a decelerator of a conventional electric power steering apparatus is divided into three parts: a rotary housing having a worm wheel housing and a worm/motor housing; a first worm wheel housing cap; and a second worm wheel housing cap, and the decelerator is assembled having the concentricity between a worm wheel housing pivot center axis and a worm wheel center axis of a first and a second worm wheel housing cap, and then the rotary housing relatively rotates to the first worm wheel housing cap and the second worm wheel housing cap when a worm tooth is matched with a worm wheel tooth so as to control the distance between the worm tooth and the worm wheel tooth, so that clearance is controlled.

In accordance with an aspect of the present invention, there is provided a clearance adjusting decelerator, including: a rotary housing including a worm/motor housing including a worm therein and a worm wheel housing having both sides open, the rotary housing being rotatable about a worm wheel housing pivot center axis; a first worm wheel housing cap including a first cap tooth formed on one side surface and a first body integrally formed with the first cap tooth, the first body including a first inserting hole, formed on a center portion, to have a shaft pass in it and at least one first assembly hole formed on a rim thereof, wherein a worm wheel center axis passing through a center of the first inserting hole is spaced apart from the worm wheel housing pivot center axis; a second worm wheel housing cap including a second cap tooth formed on one side surface and a second body integrally formed with the second cap tooth, the second body including a second inserting hole, formed on a center portion, to have a shaft pass in it and at least one second assembly hole formed on a rim thereof, wherein a worm wheel center axis passing through a center of the second inserting hole is spaced apart from the worm wheel housing pivot center axis; and at least one fastening member passing through at least one first assembly hole formed on the first worm wheel housing cap and at least one second assembly hole formed on the second worm wheel housing cap.

In accordance with another aspect of the present invention, there is provided an electric power steering apparatus, including: a worm wheel connected to a steering shaft; a worm engaged with the worm wheel; a motor for providing a rotational force to the worm; and a gear housing enclosing the worm wheel, the worm and the motor; wherein the gear housing includes: a rotary housing including a worm/motor housing including the worm therein and a worm wheel housing having both sides open, the rotary housing being rotatable about a worm wheel housing pivot center axis; a first worm wheel housing cap including a first cap tooth formed on one side surface and a first body integrally formed with the first cap tooth, the first body including a first inserting hole, formed on a center portion, to have the steering shaft pass in it and at least one first assembly hole formed on a rim thereof, wherein a worm wheel center axis passing through a center of the first inserting hole is spaced apart from the worm wheel housing pivot center axis; a second worm wheel housing cap including a second cap tooth formed on one side surface and a second body integrally formed with the second cap tooth, the second body including a second inserting hole, formed on a center portion, to have the steering shaft pass in it and at least one second assembly hole formed on a rim thereof, wherein a worm wheel center axis passing through a center of the second inserting hole is spaced apart from the worm wheel housing pivot center axis; and at least one fastening member passing through at least one first assembly hole formed on the first worm wheel housing cap and at least one second assembly hole formed on the second worm wheel housing cap.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
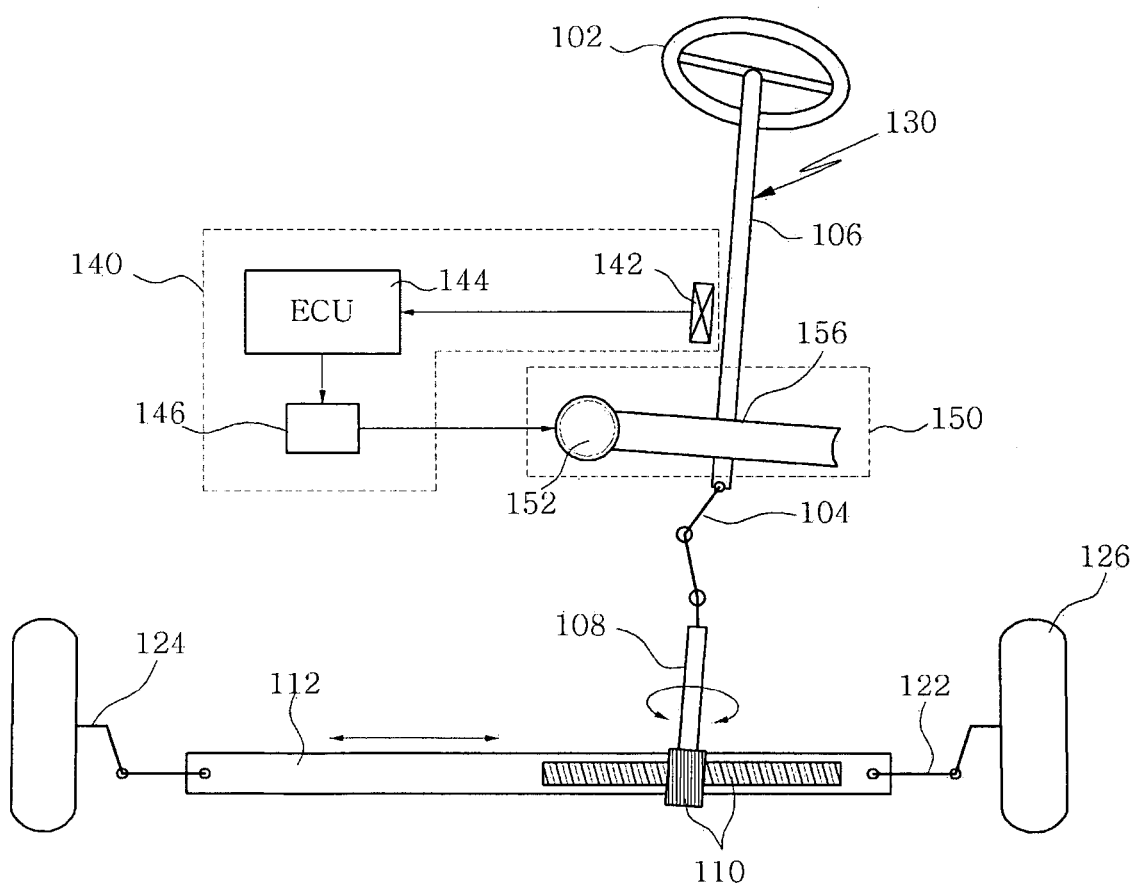
FIG. 1 is a diagram illustrating a conventional electric power steering apparatus.
Figure 2:
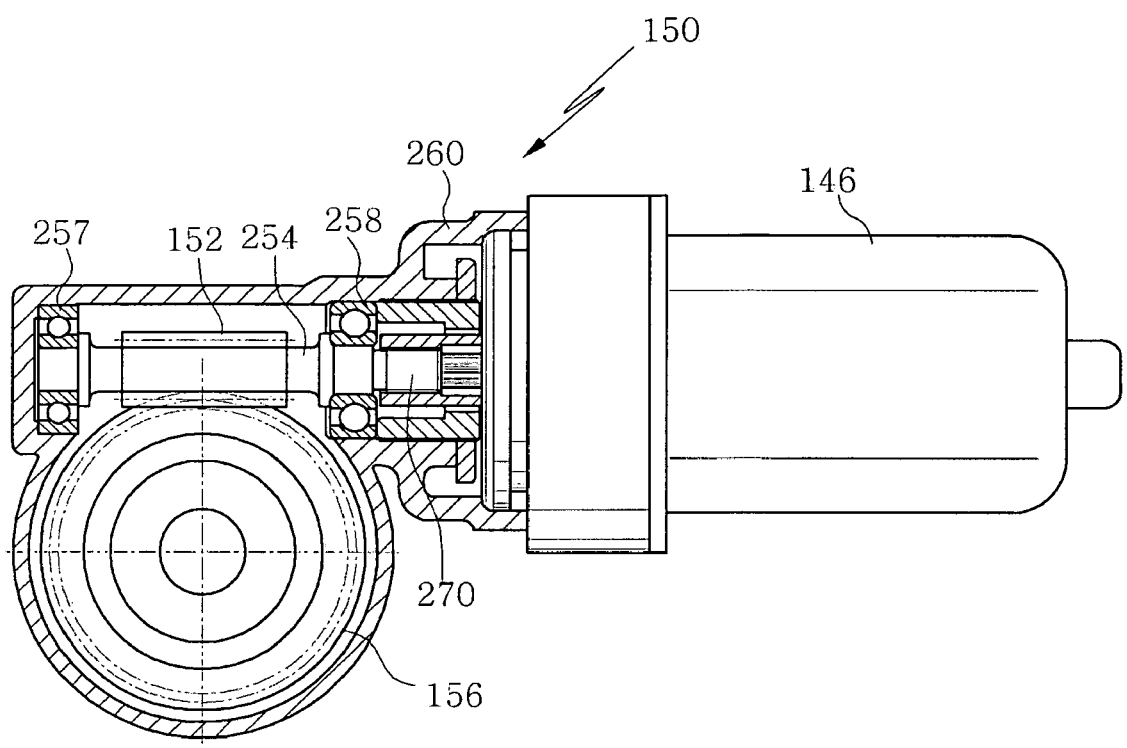
FIG. 2 is a cross-section view illustrating a decelerator of a conventional electric power steering apparatus.

Hereinafter, an exemplary embodiment of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

Figure 3A:
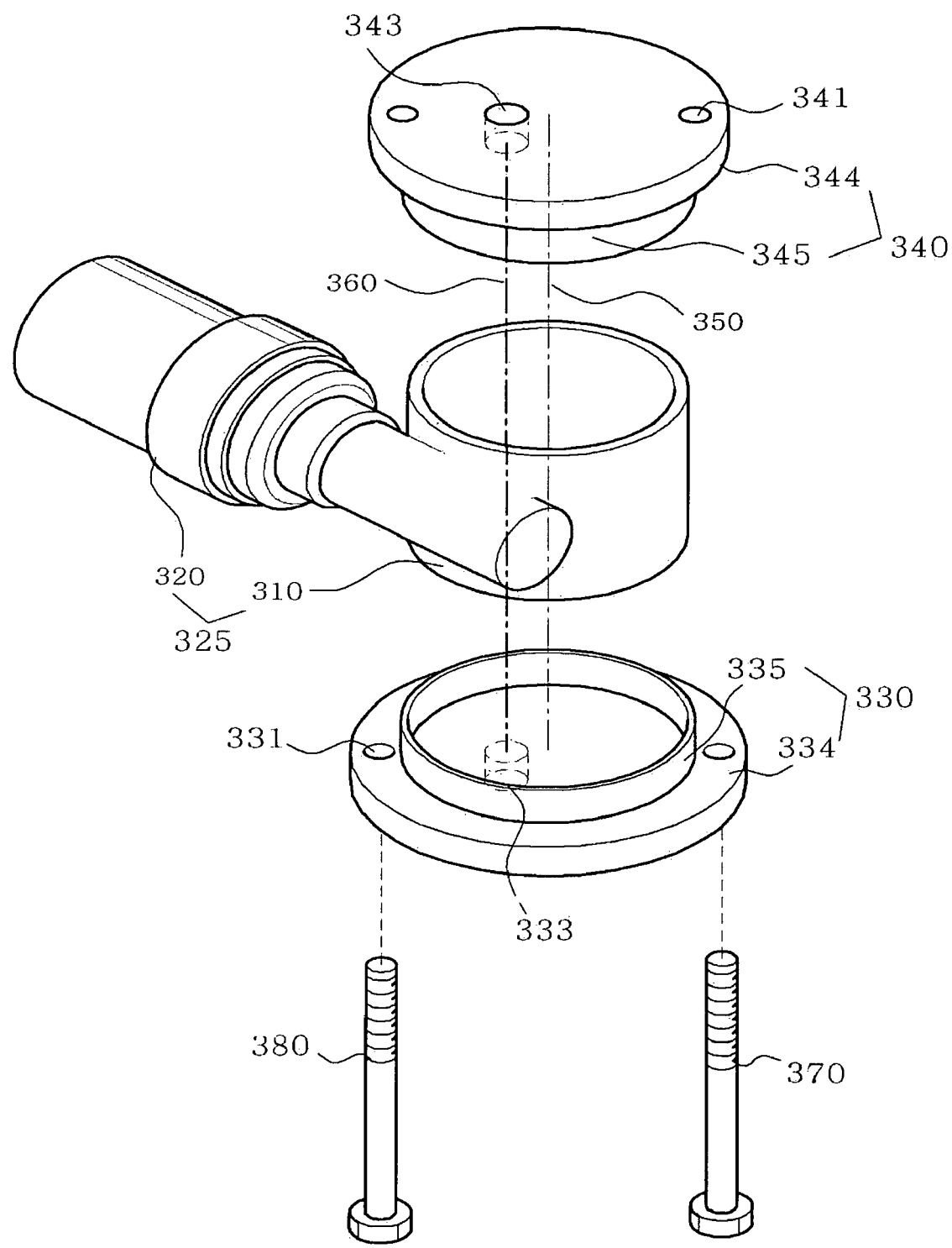
FIG. 3A is an assembly perspective view illustrating a clearance adjusting decelerator according to a first exemplary embodiment of the present invention.
Figure 3B:
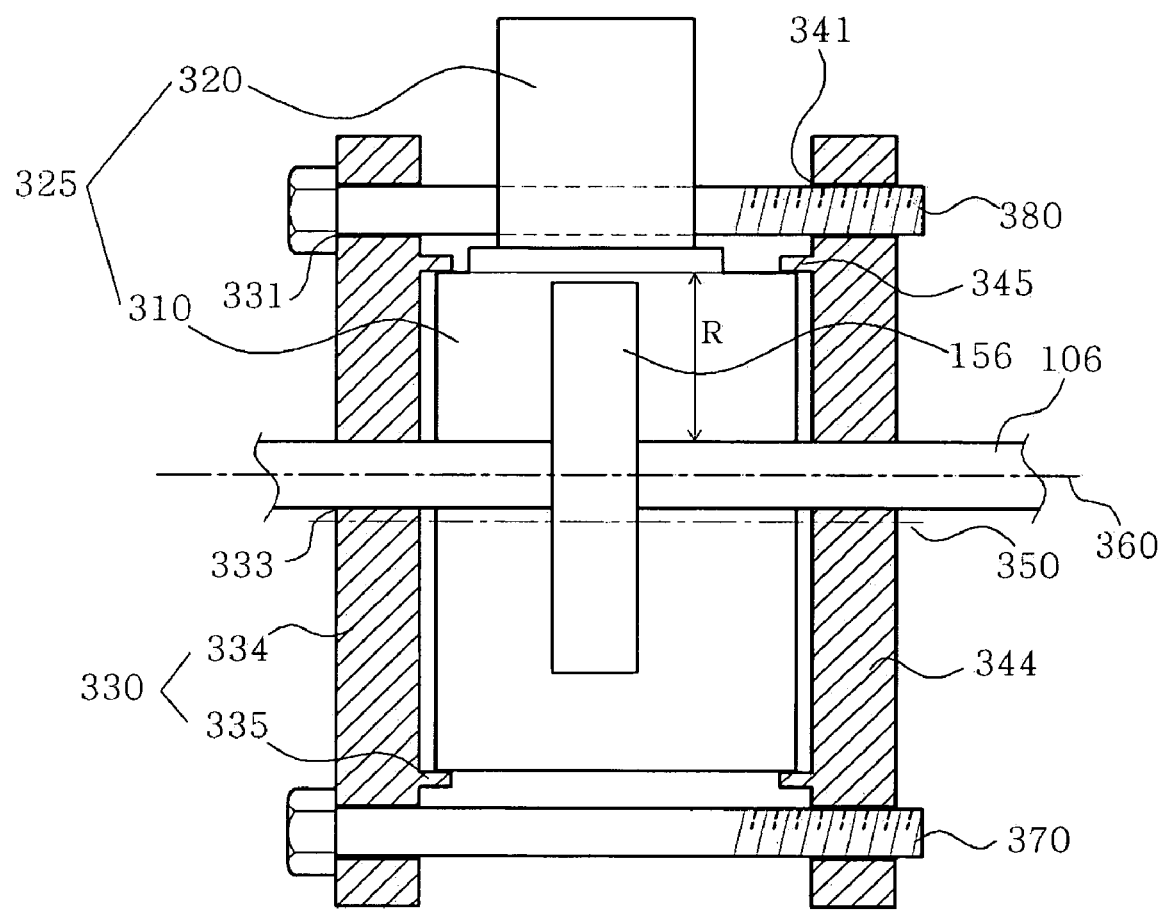
FIG. 3B is a plane cross-sectional view illustrating a clearance adjusting decelerator according to a first exemplary embodiment of the present invention.

FIG. 3A is an assembly perspective view illustrating a clearance adjusting decelerator according to a first exemplary embodiment of the present invention and FIG. 3B is a plane cross-sectional view illustrating a clearance adjusting decelerator according to a first exemplary embodiment of the present invention. Referring to FIGS. 3A and 3B, a clearance adjusting decelerator according to a first exemplary embodiment of the present invention includes a rotary housing 325 having a worm/motor housing 320 and a worm wheel housing 310, a first worm wheel housing cap 330, a second worm wheel housing cap 340, and at least one fastening member 370 and 380.

The rotary housing 325 includes the worm/motor housing 320 having a worm therein and the worm wheel housing 310 having the both open sides and may relatively rotates to the first worm wheel housing cap 330 and the second worm wheel housing cap 340 about a worm wheel housing pivot center axis 350.

The worm wheel housing 310 has a shape of a hollow cylinder and includes the worm wheel 156 therein (referring to FIG. 5A) so that a diameter of the worm wheel housing 310 is formed to be appropriately larger than that of the worm wheel 156.

Especially, a center line (i.e. a worm wheel center axis 360) of a shaft passing through the worm wheel 156 is spaced apart from the worm wheel housing pivot center axis 350 in a predetermined distance. Therefore, an appropriate size should be secured in order that the worm wheel 156 does not contact an inner surface of the worm wheel housing 310. That is, the short length(R) in the length from the worm wheel center axis 360 to the inner surface of the worm wheel housing 310 should be longer than a radius of the worm wheel 156.

Here, the afore-mentioned shaft is a shaft passing through the worm wheel 156 in the common clearance adjusting decelerator, and particularly corresponds to a steering shaft 106 when applied to a steering apparatus. Therefore, the axis will be described hereinafter with an example of the steering shaft 106.

The worm/motor housing 320 includes the worm therein, in which a portion surrounding the worm crosses a partial outer surface of the worm wheel housing 310 so that it is possible to appropriately surround the worm engaged with the worm wheel 156.

The first worm wheel housing cap 330 includes a first cap tooth 335 formed on one side surface thereof and a first body 334 integrally formed with the first cap tooth 335, and the first body includes a first inserting hole 333, formed on a center portion thereof, to have the shaft pass in it and at least one first assembly hole 331 formed on a rim thereof. Further, the worm wheel center axis 360 passing through the center of the first inserting hole 333 is spaced apart from the worm wheel housing pivot center axis 350.

The first cap tooth 335 has a shape of the hollow cylinder in which one side thereof is integrally formed on one surface of the first body 334 and the other side thereof is fitted to one side of the worm wheel housing 310.

At this time, the worm wheel housing 310 is required to relatively rotate to the first cap tooth 335 in a state where the first cap tooth 335 is fitted to the worm wheel housing 310 so that it is preferred that an inner diameter of the first cap tooth 335 is formed slightly larger than an outer diameter of the worm wheel housing 310. However, it is not limited thereto. In contrast, the outer diameter of the first cap tooth 335 is formed slightly smaller than the inner diameter of the worm wheel housing 310 so that the first cap tooth 335 may be fitted to the worm wheel housing 310.

Further, it is preferred that the height of the first cap tooth 335 secures a sufficient length in order to provide the sufficient friction force when the worm wheel housing 310 relatively rotates to the first cap tooth 335 in a state where the first cap tooth 335 is fitted to the one side of the worm wheel housing 310.

The first body 334 is shaped like a cylinder and is integrally formed with the first cap tooth 335, wherein the first inserting hole 333 through which the steering shaft 106 passes is formed passing through the first body 334 and at least one first assembly hole 331 is formed on the rim of the first body 334.

Further, the diameter of the first body 334 is formed appropriately larger than the outer diameter of the first cap tooth 335.

The center of the first inserting hole 333, i.e. the worm wheel center axis 360, and the center of the first cap tooth 335, i.e. the worm wheel housing pivot center axis 350, are spaced apart from each other in a predetermined distance(d).

At this time, it is preferred that the spaced distance(d) between the center of the first inserting hole 333 and the center of the first cap tooth 335 maintains the range of 3~7 mm.

The first assembly holes 331 are formed on the rim of the first body 334 maintaining the appropriate space in a circumference direction, and a first fastening member 370 and a second fastening member 380 are fastened passing through the first assembly holes 331 and the second assembly holes 341.

The number of the fastening members is determined corresponding to the number of the first assembly holes 331.

It is preferred that the first fastening member 370 and the second fastening member 380 include the screws in order to provide a sufficient fastening force to the first worm wheel housing cap 330 and the second worm wheel housing cap 340. The fastening method is various, where a thread is provided in the inner surface of the first assembly hole 331 and the second assembly hole 341 so that the screw is screwed thereto, the first fastening member 370 and the second fastening member 380 are inserted into the first assembly hole 331 and the second assembly hole 341 and are fixed with the nuts, or the like.

In FIG. 3A, there are two first assembly holes 331, however the present invention is not limited thereto.

That is, the number of the first assembly holes 331 may be three or more, as long as the appropriate fastening force can be provided between the first worm wheel housing cap 330 and the second worm wheel housing cap 340.

The second worm wheel housing cap 340 includes a second cap tooth 345 formed on one side surface thereof and a second body 344 integrally formed with the second cap tooth 345, and the second body includes a second inserting hole 343, formed on a center portion thereof, to have the shaft (i.e., the steering shaft 106) pass in it and at least one second assembly hole 341 formed on a rim thereof. Further, the worm wheel center axis 360 passing through the center of the second inserting hole 343 is spaced apart from the worm wheel housing pivot center axis 350.

The configuration and the shape of the second worm wheel housing cap 340 is formed corresponding to those of the first worm wheel housing cap 330, and thus a detailed description of the second worm wheel housing cap 340 is omitted.

Figure 4A:
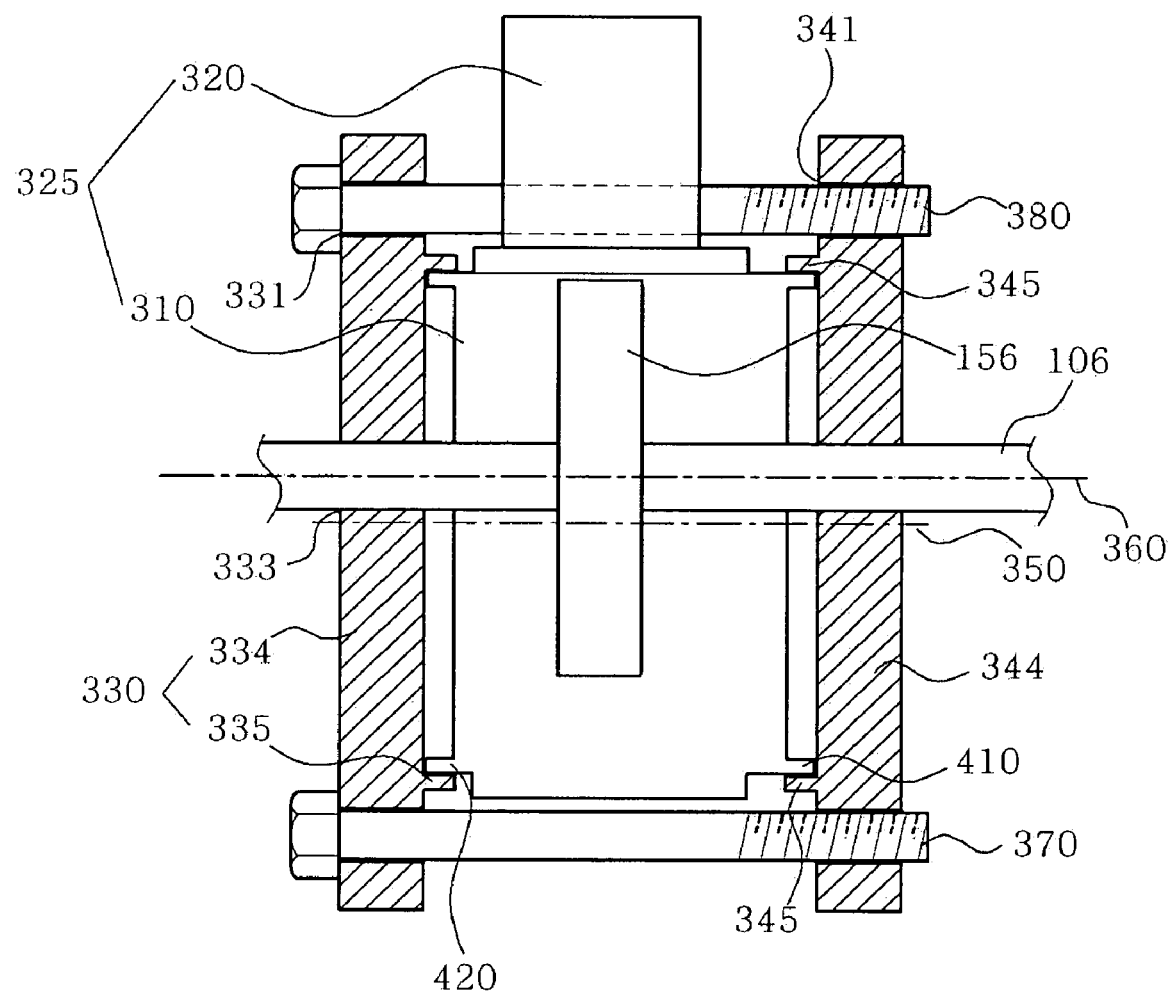
FIG. 4A is a plane cross-sectional view illustrating a clearance adjusting decelerator according to a second exemplary embodiment of the present invention.
Figure 4B:
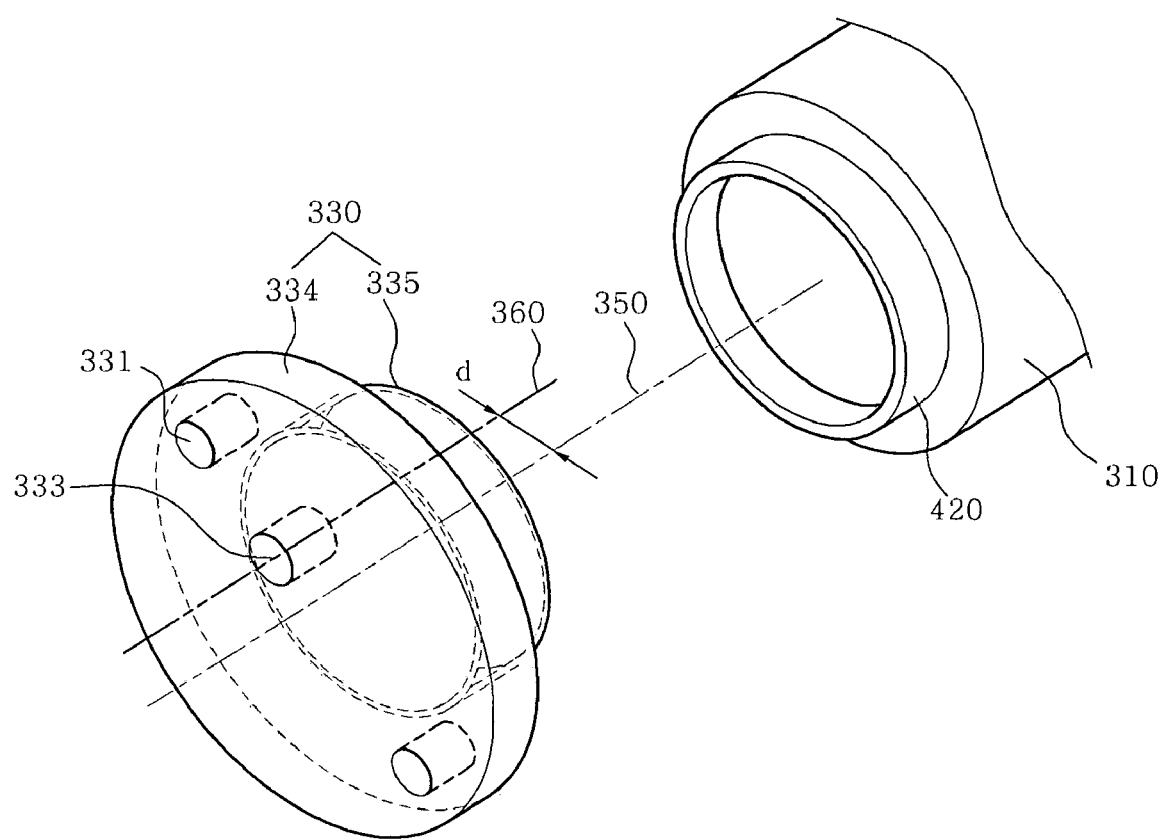
FIG. 4B is a partial perspective view illustrating the assembly of a cap tooth and a housing tooth of a clearance adjusting decelerator according to a second exemplary embodiment of the present invention.

FIG. 4A is a plane cross-sectional view illustrating a clearance adjusting decelerator according to a second exemplary embodiment of the present invention and FIG. 4B is a partial perspective view illustrating the assembly of a cap tooth and a housing tooth of a clearance adjusting decelerator according to a second exemplary embodiment of the present invention. Referring to FIGS. 4A and 4B, both sides of the worm wheel housing 310 of the clearance adjusting decelerator according to the second exemplary embodiment of the present invention are formed with a first housing tooth 410 and a second housing tooth 420.

As described above, when forming the first housing tooth 410 and the second housing tooth 420, the outer diameter of the first housing tooth 410 and the second housing tooth 420 may be formed appropriately smaller than the inner diameter of the first cap tooth 335 and the second cap tooth 345.

Figure 5A:
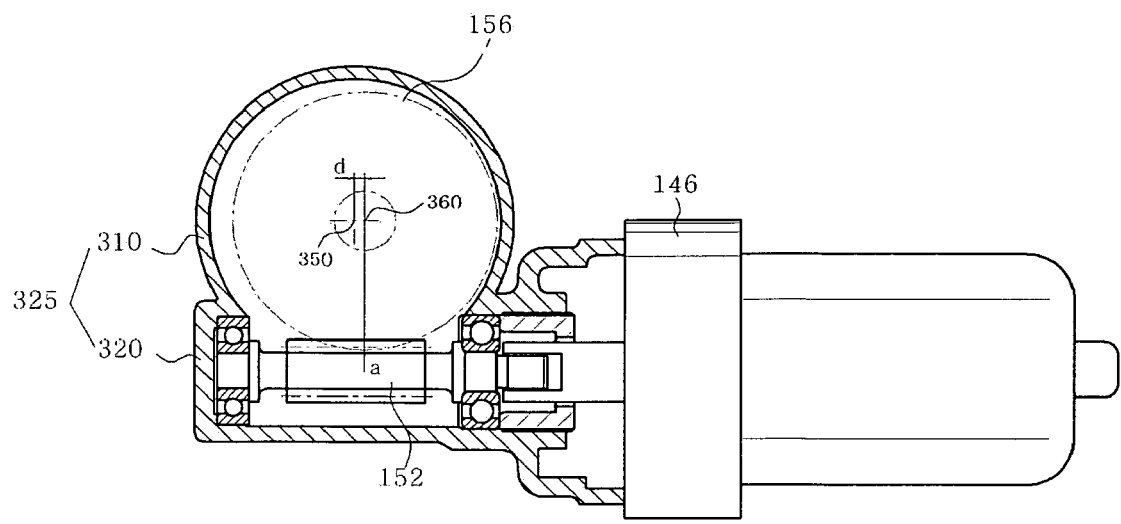
FIG. 5A is a cross-section view illustrating a state prior to adjusting the clearance of a clearance adjusting decelerator according to an exemplary embodiment of the present invention.
Figure 5B:
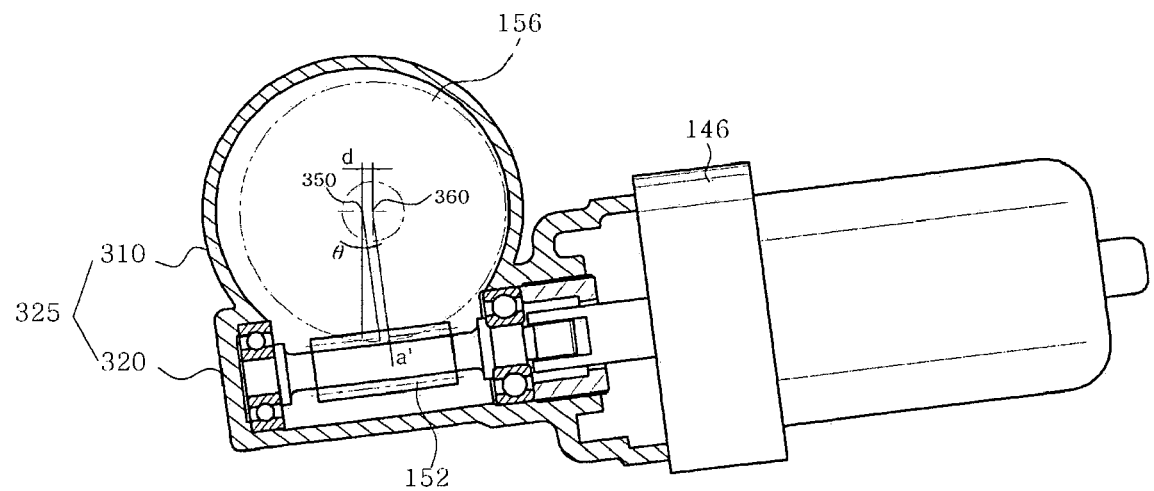
FIG. 5B is a cross-section view illustrating a state after adjusting the clearance of a clearance adjusting decelerator according to an exemplary embodiment of the present invention.

FIG. 5A is a cross-section view illustrating a state prior to adjusting the clearance of a clearance adjusting decelerator according to an exemplary embodiment of the present invention and FIG. 5B is a cross-section view illustrating a state after adjusting the clearance of a clearance adjusting decelerator according to an exemplary embodiment of the present invention. Hereinafter, the process of adjusting the clearance of a clearance adjusting decelerator according to an exemplary embodiment of the present invention will be described with reference to FIGS. 5A and 5B.

First, FIG. 5A shows the state where the worker assembles the rotary housing 325, the worm 152, the motor 146, the worm wheel 156, or the like.

That is, the worm wheel housing pivot center axis 350 and the worm wheel center axis 360 are spaced apart from each other at a distance(d). At this time, a gear tooth of the worm wheel 156 comes into contact with a gear tooth of the worm 152 while crossing as much as "a".

When a re-adjustment of the distance crossed by the gear tooth of the worm wheel 156 and the gear tooth of the worm 152 is required, the worker relatively rotates the rotary housing 325 to the first worm wheel housing cap 330 and the second worm wheel housing cap 340 as much as a pivot angle(θ) as shown in FIG. 5B.

Then, the rotary housing 325 rotates on the worm wheel housing pivot center axis 350, the gap between the gear tooth of the worm wheel 156 and the gear tooth of the worm 152 after rotating comes to "a'", and the gap in which the gear teeth meet becomes even narrower, so that clearance between the worm wheel 156 and the worm 152 can be controlled.

By controlling the distance(d) between the worm wheel housing pivot center axis 350 and the worm wheel center axis 360 upon controlling clearance, the sensitivity can be controlled.

Here, the sensitivity means the difference between the crossing distance "a'" changed depending on the rotation of the rotary housing 325 from the worker between the gear tooth of the worm wheel 156 and the gear tooth of the worm 152 and the crossing distance "a" between the gear tooth of the worm wheel 156 and the gear tooth of the worm 152 prior to controlling clearance.

That is, when increasing the distance(d) between the worm wheel housing pivot center axis 350 and the worm wheel center axis 360, the difference "a'-a" between the distance after adjusting clearance and the distance prior to adjusting clearance relative to an identical pivot angle($\theta$) is increased so that the sensitivity is increased. In contrast, when decreasing the distance(d) between the worm wheel housing pivot center axis 350 and the worm wheel center axis 360, the difference "a'-a" between the distance after adjusting clearance and the distance prior to adjusting clearance relative to an identical pivot angle($\theta$) is decreased, so that the sensitivity is decreased.

It is preferred that the pivot angle($\theta$) depending on the distance(d) between the worm wheel housing pivot center axis 350 and the worm wheel center axis 360 is controlled within a range of 2°~7°.

As described above, the present invention provides clearance adjusting decelerator and the electric power steering apparatus having the same in which the gear housing constructing the decelerator of the conventional electric power steering apparatus is divided into three parts: the rotary housing having the worm wheel housing and the worm/motor housing; the first worm wheel housing cap; and the second worm wheel housing cap, and the decelerator is assembled having the concentricity between the worm wheel housing pivot center axis and the worm wheel center axis of the first and the second worm wheel housing cap, and then the rotary housing relatively rotates to the first worm wheel housing cap and the second worm wheel housing cap when the worm tooth is matched with the worm wheel tooth so as to control the distance between the worm tooth and the worm wheel tooth, so that clearance is controlled.

Although an exemplary embodiment of the present invention has been described for illustrative purposes, those skilled in the art will appreciate that various modifications, additions and substitutions are possible, without departing from the scope and spirit of the invention as disclosed in the accompanying claims. Therefore, the embodiment disclosed in the present invention has been described not for limiting the scope of the invention, but for describing the invention. Accordingly, the scope of the invention is not to be limited by the above embodiment but by the claims and the equivalents thereof. It will be understood by those skilled in the art that various changes in form and details may be made therein without departing from the spirit and scope of the invention as defined by the appended claims.

What is claimed is:

1. A clearance adjusting decelerator, comprising:
    a rotary housing including a worm/motor housing having a worm therein and a worm wheel housing having both sides open and having a worm wheel therein, the rotary housing being rotatable about a worm wheel housing pivot center axis;
    a first worm wheel housing cap including a first cap tooth formed on one side surface and a first body integrally formed with the first cap tooth, the first body having a first inserting hole, formed on a center portion, to have a shaft pass in it and at least one first assembly hole formed on a rim thereof, wherein a worm wheel center axis passing through a center of the first inserting hole is spaced apart from the worm wheel housing pivot center axis;
    a second worm wheel housing cap including a second cap tooth formed on one side surface and a second body integrally formed with the second cap tooth, the second body having a second inserting hole, formed on a center portion, to have the shaft pass in it and at least one second assembly hole formed on a rim thereof, wherein a worm wheel center axis passing through a center of the second inserting hole is spaced apart from the worm wheel housing pivot center axis;
    at least one fastening member passing through at least one first assembly hole formed on the first worm wheel housing cap and at least one second assembly hole formed on the second worm wheel housing cap; and
    wherein clearance between the worm and the worm wheel is adjusted by rotating the rotary housing relative to the worm wheel housing pivot center axis.

2. The clearance adjusting decelerator as claimed in claim 1, wherein both sides of the worm wheel housing includes a housing tooth, respectively, so that the housing tooth is fitted to the cap tooth.

3. The clearance adjusting decelerator as claimed in claim 1, wherein the worm wheel center axis passing through the first inserting hole and the second inserting hole is spaced apart from the worm wheel housing pivot center axis by a range of 3~7 mm.

4. The clearance adjusting decelerator as claimed in claim 1, wherein a pivot angle($\theta$) by which the rotary housing rotates relative to the worm wheel housing pivot center axis is a range of 2°~7°.

5. The clearance adjusting decelerator as claimed in claim 1, wherein the fastening member includes a screw.

6. An electric power steering apparatus, comprising:
    a worm wheel connected to a steering shaft;
    a worm engaged with the worm wheel;
    a motor for providing a rotational force to the worm; and
    a gear housing enclosing the worm wheel, the worm and the motor,
    wherein the gear housing comprises:
    a rotary housing including a worm/motor housing having the worm therein and a worm wheel housing having both sides open and having a worm wheel therein, the rotary housing being rotatable about a worm wheel housing pivot center axis;
    a first worm wheel housing cap including a first cap tooth formed on one side surface and a first body integrally formed with the first cap tooth, the first body having a first inserting hole, formed on a center portion, to have the steering shaft pass in it and at least one first assembly hole formed on a rim thereof, wherein a worm wheel center axis passing through a center of the first inserting hole is spaced apart from the worm wheel housing pivot center axis;
    a second worm wheel housing cap including a second cap tooth formed on one side surface and a second body integrally formed with the second cap tooth, the second body having a second inserting hole, formed on a center portion, to have the steering shaft pass in it and at least one second assembly hole formed on a rim thereof, wherein a worm wheel center axis passing through a center of the second inserting hole is spaced apart from the worm wheel housing pivot center axis;

at least one fastening member passing through at least one first assembly hole formed on the first worm wheel housing cap and at least one second assembly hole formed on the second worm wheel housing cap; and wherein clearance between the worm and the worm wheel is adjusted by rotating the rotary housing relative to the worm wheel housing pivot center axis.

7. A clearance adjusting speed reducer, comprising:

a worm/motor housing surrounding a worm;

a worm wheel housing surrounding a worm wheel and having both sides open;

a rotary housing having the worm/motor housing and the worm wheel housing, the rotary housing being rotatable about a worm wheel housing pivot center axis;

a first worm wheel housing cap including a first body having a first inserting hole, formed on a center portion, to have a shaft pass through it, wherein a worm wheel center axis passing through a center of the first inserting hole is spaced apart from the worm wheel housing pivot center axis; and a second worm wheel housing cap including a second body having a second inserting hole, formed on a center portion, to have the shaft pass through it, wherein the worm wheel center axis passing through a center of the second inserting hole is spaced apart from the worm wheel housing pivot center axis, wherein clearance between the worm and the worm wheel is adjusted by rotating the rotary housing relative to the worm wheel housing pivot center axis.

* * * * *